United States Patent [19]

Terasawa

[11] 4,410,900

[45] Oct. 18, 1983

[54] INK JET RECORDING APPARATUS

[75] Inventor: Koji Terasawa, Mitaka, Japan

[73] Assignee: Canon Kabushiki Kaisha, Tokyo, Japan

[21] Appl. No.: 414,889

[22] Filed: Sep. 3, 1982

Related U.S. Application Data

[63] Continuation of Ser. No. 197,594, Oct. 16, 1980, abandoned.

[30] Foreign Application Priority Data

Oct. 23, 1979 [JP] Japan ................................ 54-135914
Jan. 21, 1980 [JP] Japan ................................ 55-5425

[51] Int. Cl.3 ............................................ G01D 15/18
[52] U.S. Cl. ............................................ 346/140 R
[58] Field of Search .............. 346/140 R, 75; 400/126

[56] References Cited

U.S. PATENT DOCUMENTS

| | | | |
|---|---|---|---|
| 3,673,601 | 6/1972 | Hertz | 346/75 |
| 4,045,802 | 8/1977 | Fukazawa et al. | 346/140 |
| 4,123,761 | 10/1978 | Kimura et al. | 346/140 |
| 4,160,982 | 7/1979 | Keur | 346/140 X |
| 4,272,772 | 6/1981 | Geil | 346/140 |
| 4,306,245 | 12/1981 | Kasugayama | 346/140 |

*Primary Examiner*—Joseph W. Hartary
*Attorney, Agent, or Firm*—Fitzpatrick, Cella, Harper & Scinto

[57] ABSTRACT

An ink jet recording apparatus of the type in which ink is jetted toward recording paper from the tip end of a recording head to effect printing on the recording paper. The recording head is provided with a capping for covering the tip end of the head. The capping includes an ink suction mechanism for sucking ink from the recording head with its tip end being capped.

12 Claims, 12 Drawing Figures

INK JET RECORDING APPARATUS

This is a continuation of application Ser. No. 197,594, filed Oct. 16, 1980, now abandoned.

BACKGROUND OF THE INVENTION

1. Field of the Invention

The present invention relates to an ink jet recording apparatus and more particularly to capping means for the recording head of the apparatus.

2. Description of the Prior Art

The above-mentioned type of ink jet recording apparatus is often used in a portable miniature electronic apparatus such as desk calculator with a mounted-in printer. In this case various problems arise in carrying the portable apparatus in one's arms which may occur very seldom in the case where such ink jet recording apparatus is mounted in a practically stationary electronic apparatus such as data terminal. For example, in carrying the portable electronic apparatus in one's arms, the ink jet printer mounted in the apparatus is subjected to impact and/or vibration. Also, the electronic apparatus is sometimes inclined. Examples of trouble caused by such impact, vibration and inclination are retrogradation of meniscus of ink in the nozzle portion of the recording head, ink leak from the nozzle and generation of air bubbles. All of these troubles are main causes for poor ink jet, degraded printing and contamination in the apparatus. Another problem arises when the ink jet printer is left standing unused for a long time. In this case, the ink within the nozzle part gets dried and it is no longer possible to use the printer at once when required.

SUMMARY OF THE INVENTION

Accordingly it is an object of the invention to provide an ink jet recording apparatus in which no trouble is caused by ink.

It is another object of the invention to eliminate the trouble of poor ink jet.

It is a further object of the invention to eliminate the trouble of dried ink at the tip end of the recording head.

It is a still further object of the invention to provide suction means which is operable manually without any need of particular power source.

It is a further object to provide cap suction means which is simple in structure and easy to operate.

BRIEF DESCRIPTION OF THE DRAWINGS

Other and further objects, features and advantages of the invention will appear more fully from the following description taken in connection with the accompanying drawings, in which.

DESCRIPTION OF THE PREFERRED EMBODIMENTS

Figure 1A:
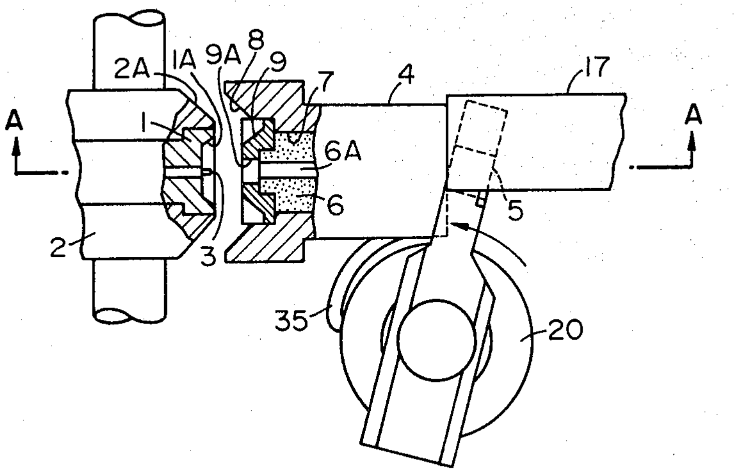
FIG. 1A is a plan view of a recording head capping device showing a first embodiment of the invention.
Figure 1B:
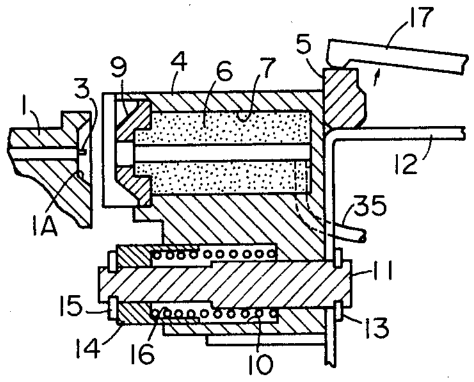
FIG. 1B is a sectional view taken along the line A—A in FIG. 1A.

In FIGS. 1A and 1B showing a preferred embodiment of the invention, reference numeral 1 designates a recording head mounted on a carriage 2. The recording head 1 has a nozzle 3 at its point. The carriage 2 has a tapered portion 2A formed on the left and right outer walls (upper and lower outer walls as viewed on the drawing of FIG. 1A) surrounding the recording head. The point of the recording head 1 is cut out to form a concaved portion 1A. Designated by 4 is a cap slide which is slidably moved toward the carriage 2 by a manual lever 5. The cap slide 4 has a cap portion facing the recording head 1. In the cap portion there is provided a deep bore 7 filled with an ink absorber 6. The ink absorber 6 has a center bore 6A serving as a passage. At the free end the cap portion is inwardly tapered to form a concaved portion 8 mating with the above mentioned tapered portion 2A provided on the carriage 2. A convex elastic cap 9 is fitted in the middle of the concaved portion 8 to cover the abosorber 6. The elastic cap 9 is so shaped as to be fitted into the concaved portion 1A formed on the recording head 1. The cap 9 has a center opening 9A in communication with the passage 6A. As seen best in FIG. 1B, the cap slide 4 has an axial bore 10 in parallel with the above mentioned deep bore 7. A shaft 11 is inserted in the axial bore 10. At one end the shaft 11 is fixed on a cap fixing plate 12 by means of snap ring 13 or the like. The fixing plate 12 is in turn mounted on an electronic apparatus (not shown) on which the ink jet printer is mounted. At the other end the shaft 11 is fixed to the free end of a boss 14 by means of snap ring 15. The boss 14 is in turn fitted into the axial bore 10. Therefore, when the cap slide 4 is slidably moved toward the recording head 1, the axial bore 10 also is moved sliding on the boss 14 in the direction of axis of the shaft 11. A compression spring 16 is disposed between the axial bore 10 and the boss 14 so that at the time of such slide movement the cap slide 4 is elastically biased toward the fixing plate 12. Designated by 17 is a spring lock member which locks the lever 5 when it is turned counter-clockwise as viewed on the drawing of FIG. 1A. A pump body 20 constitutes a part of a nozzle suction device as later described. The above mentioned passage 6A and this pump body 20 are connected by a suction pipe 35.

Figure 2:
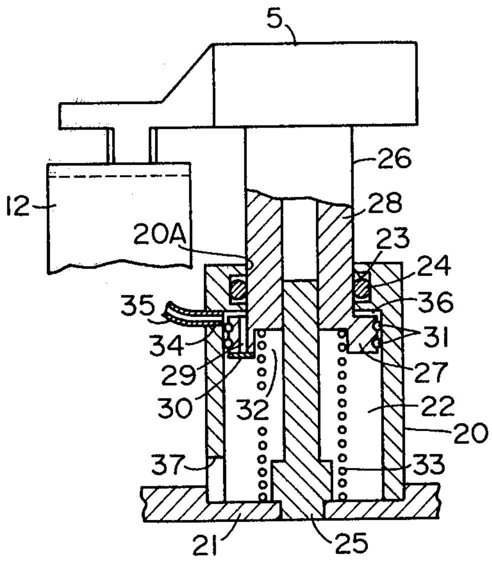
FIG. 2 is a partially cutaway sectional view of the nozzle suction device used in the apparatus shown in FIG. 1.

FIG. 2 shows a form of ink suction means, that is, a nozzle suction device provided on the above capping device according to the invention.

In FIG. 2, the suction pump body 20 mentioned above is fixed on a base member 21. The pump body 20 is cylindrical in shape and has therein a suction room 22 and an annular sealing slot 23 spaced from the suction room 22. The diameter of the suction room 22 is larger than that of the annular slot 23. Above the annular slot 23 the pump body has an opening 20A. An O-ring 24 is fitted into annular sealing slot 23. Within the pump body 20 a shaft 25 extends upward. The lower end of the shaft 25 is fixed to the base member 21 and the top end lies in the level nearly equal to the mid-level of the annular sealing slot 23. Designated by 26 is a piston of suction pump disposed approximately normal to the recording head 1. The top end of the piston 26 is fixed to the above mentioned lever 5. The piston 26 is composed of two parts, that is, a small diameter part 28 and an enlarged lower end part 27. The small diameter part 28 depends from the lever 5 and passes through the opening 20A and the annular sealing slot 23. The enlarged part 27 is engaged in the suction room 22 and limits the slide movement of the piston. In the enlarged lower end part 27 there is formed a passage 29 passing through the part axially. A valve 30 is mounted on the lower end opening of the passage 29 opened to the suction room 22. The valve 30 opens and closes in response to the change of pressure difference between the pressure at the upper opening side and that at the lower opening side of the passage 29. Also, an O-ring 31 is disposed on the outer wall of the enlarged part 27 to provide a seal between the outer wall and the suction room 22. The bottom of the enlarged part 27 of the piston 26 is cut out to form a recess 32. A compression spring 33 is disposed between the recess 32 and the base member 21. After the piston 26 is manually moved down in use, it can automatically return back its original position under the action of the compression spring 33.

To connect the one end of the suction pipe 35 to the suction room 22, a communication hole 34 is provided at the upper portion of the side wall of the suction room. The other end of the suction pipe 35 is in communication with the passage 6A formed in the ink absorber 6 as shown in FIG. 1B. Therefore, when the piston 26 is pushed down, the space 36 formed between the enlarged end part 27 of the piston and the upper wall of the pump body 20 is under a negative pressure by which the passage 6A is sucked into a negative pressure through the communication hole 34 and suction pipe 35. With further downward movement of the piston 26 the space 36 gradually extends downward. The pump body 20 has a hole 37 provided at the lower portion of its one side wall (the left side wall as viewed in the drawing of FIG. 2). When the space 36 has extended to the area of the hole 37, the negative pressure in the space is relieved through the hole 37. This hole 37 serves also as a discharge hole through which ink is discharged from the pump.

Figure 3A:
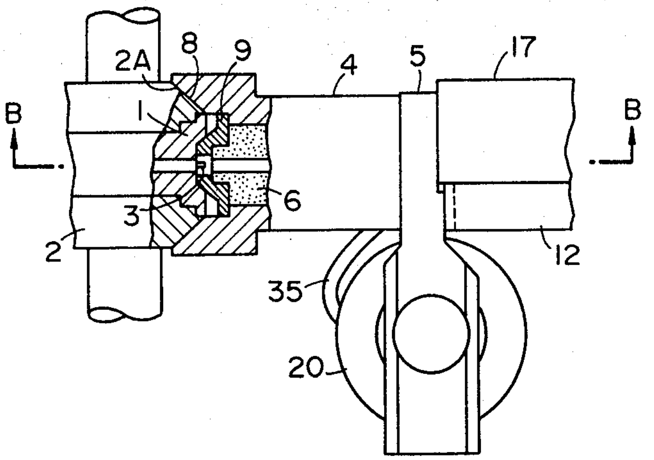
FIG. 3A illustrates the operation of the recording head capping device shown in FIGS. 1A and 1B.
Figure 3B:
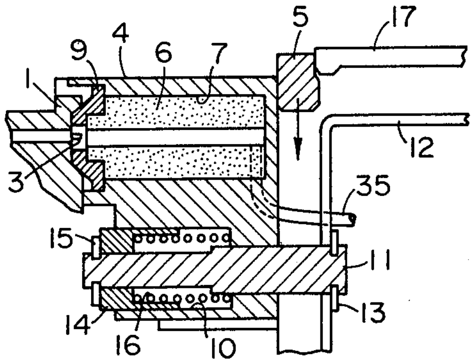
FIG. 3B is a sectional view thereof taken along the line B—B in FIG. 3A.

The operation of the above-described recording head capping device will be described hereinafter with reference to FIGS. 3A, 3B and 4.

The lever 5 is turned manually counter-clockwise (in the direction of arrow in FIG. 1A) and then the lever is locked in the rotated position by the locking member 17. In FIGS. 3A and 3B, the lever 5 is shown in this locked position. In this position, the elastic cap 9 at the fore end of the cap slide 4 is abutted against the recording head 1 to seal the nozzle 3. The nozzle 3 is received in the center opening 9A of the cap and is in opposition to the ink absorber behind the cap. Since the ink absorber 6 contains ink absorbed therein, the room within the center opening 9A surrounding the nozzle 3 is filled with ink vapor which prevents the tip end of the nozzle 3 from being dried.

Figure 4:
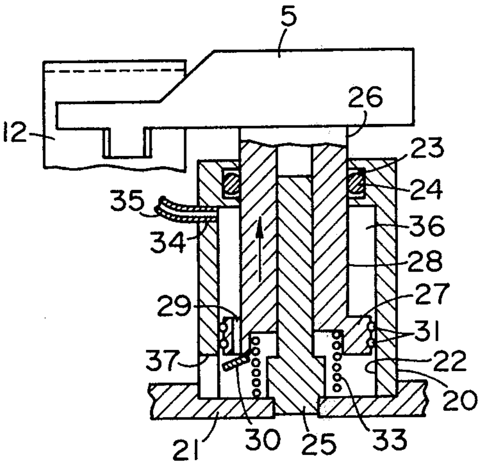
FIG. 4 illustrates the operation of the suction device shown in FIG. 2.

On the other hand, if there occurs any disorder in jetting ink from the nozzle 3 during operation due to any trouble such as retrogradation of meniscus of the ink level at the nozzle or generation of air bubbles, then the operator pushes down the piston 26 up to the position shown in FIG. 4. Thereby a negative pressure is produced in the space 36 and ink is sucked from the nozzle 3 by the action of the negative pressure. In this case, the operator moves at first the cap slide 4 to bring the elastic cap 9 into abutment with the recording head 1 as shown in FIGS. 3A and 3B. In this position, thereafter, the operator pushes down the lever 5 sliding between the fixing plate 12 and the cap slide 4 to move the piston 26 downward. Since the space formed between the enlarged part 27 of the piston and the upper wall of the pump body 20 expands with the downward movement of the piston 26, the pressure within the space becomes negative and therefore the pressure in the passage 6A communicating to the space 36 also becomes negative. On the other hand, the tank for supplying ink to the recording head 1 is always open to the atmosphere (not shown). Therefore, the ink is discharged from the nozzle 3 to the exterior by the pressure difference between the upstream side and downstream side of the nozzle 3. Thus, for example, the retrograded meniscus can be restored to its normal position and trouble in ink jet can be removed. When the operator let go his hold of the piston 26, the latter moves automatically upward under the action of the compression spring 33 and can return back to its start position as indicated by arrow in FIG. 4. At this time point, since the valve 30 is made of a film of several 10μm thick, the valve responds to the change of the pressure difference very sensitively and it opens. As a result, ink sucked into the space 36 is discharged from the pump body through the passage 29 and the discharge hole 37. The passage 29 has preferably a lower resistance than that in the suction pipe 35. This assures easy discharge of the sucked ink through the passage 29. The tapered surface 2A on the carriage head, the concaved portions 8 and 1A provided in the cap slide 4 and the recording head 1 respectively and the convexed forehead of the elastic cap 9 cooperate all together to establish alignment of the carriage 2 with the cap slide 4. Any misalignment between the two members can be corrected by these mating concave and convex portions. Therefore, according to the shown embodiment of the invention, the recording head 1 can be correctly and tightly sealed by the cap slide 4.

As readily understood from the above shown first embodiment of the invention, all of the problems involved in the prior art apparatus can be solved according to the invention. When the ink jet printer is left standing unused for a long time, the nozzle of the recording head can be covered with the cap slide 4. Since the cap slide has an absorber therein and the absorber is impregnated with ink, the nozzle tip is protected against dry-up. Therefore, whenever the operator wishes to use the printer, printing can be started at once. Also, the nozzle suction device which is additionally provided according to the invention permits the removal of trouble in jetting ink, if occurred, in a very simple manner. For example, ink jetting from the nozzle may get wrong or blocked by the retrogradation of the meniscus or generation of air bubbles mentioned above. In such a case, the nozzle suction device removes the cause for trouble by sucking ink from the nozzle toward the exterior of the apparatus. The nozzle suction device can be formed simply without any need of particular motor, solenoid, pump and the like. Thus, according to the invention, there is provided a reliable and unexpensive capping device with a nozzle suction device.

FIGS. 5 through 10 show a second embodiment of the invention. The capping device according to the second embodiment functions also as ink suction means. The structure and operation are, therefore, simplified as compared with the first embodiment.

Figure 5:
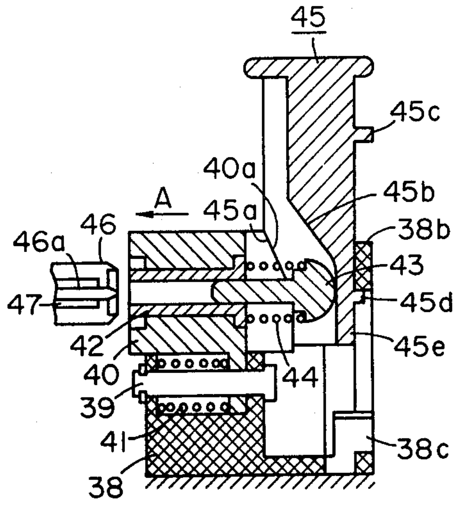
FIG. 5 is a sectional view of another recording head capping device showing a second embodiment of the invention.
Figure 6:
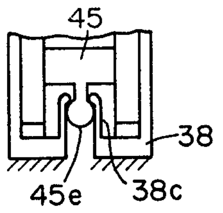
FIG. 6 is a sectional view of the locking mechanism used in the second embodiment.

In FIG. 5, reference numeral 38 designates a base member. A shaft 39 is supported by the base member at both ends of the shaft. A cap slide 40 is slidably movable along the shaft 39. To this end, a portion of the cap slide is loose fitted on the shaft. A coil spring 41 disposed on the shaft biases the cap slide to its rest position. The cap slide is generally in a form of hollow cylinder and a cylindrical cap 42 is fixed to the inner wall of the slide 40. The cylindrical cap is elastic and ink absorbent. The cap 42 forms a cylinder in which a piston 43 is inserted. The piston has a semispherical head. When the piston is slide moved forward and backward within the cylinder cap 42 there is produced within the cap a negative pressure to suck ink from the nozzle 46*a* as later described. A spring 44 is disposed between the cap slide 40 and the piston 43 to bias the piston in the direction away from the cap slide. A lever 45 is provided to move the cap 42 and piston 43. The lever is manually moved up and down in the direction substantially normal to the direction of movement of the piston 43 and cap slide 40. Normally the lever is in the position in which its slant surface 45*a* abuts against a mating slant surface 40*a* of the cap slide 40. When the lever is pushed down by the operator, the cap slide 40 is moved in the direction indicated by the arrow A so as to bring the cap 42 into pressure contact with the tip end of the recording head 46. Thus, the point of the recording head is covered with the cap. When the operator pulls up the lever 45, the cap slide 40 moves back in the opposite direction to A under the action of the spring 41. The lever 45 has also a cam surface 45*b* which can come into contact with the semispherical head of the piston 43 to move the latter in the direction of arrow A and the opposite direction to A with the lever's upward and downward movement. When the lever 45 is pulled up from the position in which the cap 42 is in contact with the tip end of the recording head 46, at first the piston 43 moves in the opposite direction to A to produce a negative pressure within the cap 42 and thereafter the cap slide 40 starts moving in the opposite direction to A. This timing of movement is set by the cam surface 45*b*.

The downward movement of the lever 45 is limited by a projection 45*c* and the upward movement by another projection 45*b*. The projections 45*c* and 45*b* cooperate with a stopper 38*b* formed as an integral portion of the base member 38. As clearly shown in FIG. 6, the lever 45 has a lower projection 45*e* which is engageable with a pawl-like portion 38*c* of the base member 38 to hold the lever 45 in its lowest position.

The recording head 46 is mounted on an ink jet recording apparatus (not shown) in the manner known per se. As shown in FIG. 5, the nozzle 46*a* of the recording head is enclosed and supported by a piezo-electric element 47. The front end of the head is so shaped as to allow a tight contact with the cap 42.

Figure 7:
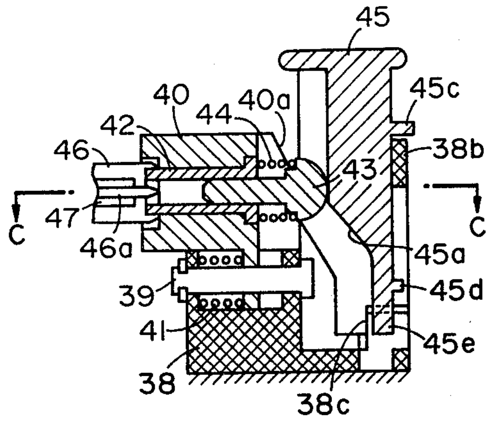
FIG. 7 illustrates the operation of the second embodiment.
Figure 8:
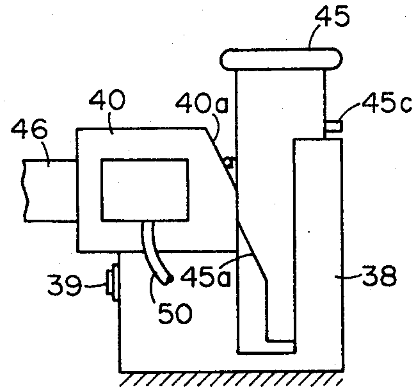
FIG. 8 is an exterior view of the second embodiment.

FIG. 7 shows the capping device in the position in which the recording head 46 is capped as a result of push-down of the lever 45. FIG. 8 is an exterior view thereof.

Figure 9:
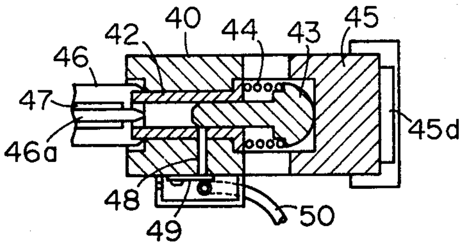
FIG. 9 is a sectional view taken along the line C—C in FIG. 7.

As seen from FIG. 9, the cap 42 has an exhaust bore 48 provided in the middle side wall. A pressure regulating valve 49 in a form of film is provided at the outlet port of the exhaust bore 48. The ink sucked from the nozzle 46*a* is discharged from a discharge nozzle 50 to the exterior through the valve 49. When the piston 43 moves in the direction of A, the valve 49 opens the outlet port of the exhaust port 48 and when the piston moves in the opposite direction the valve closes it.

Figure 10:
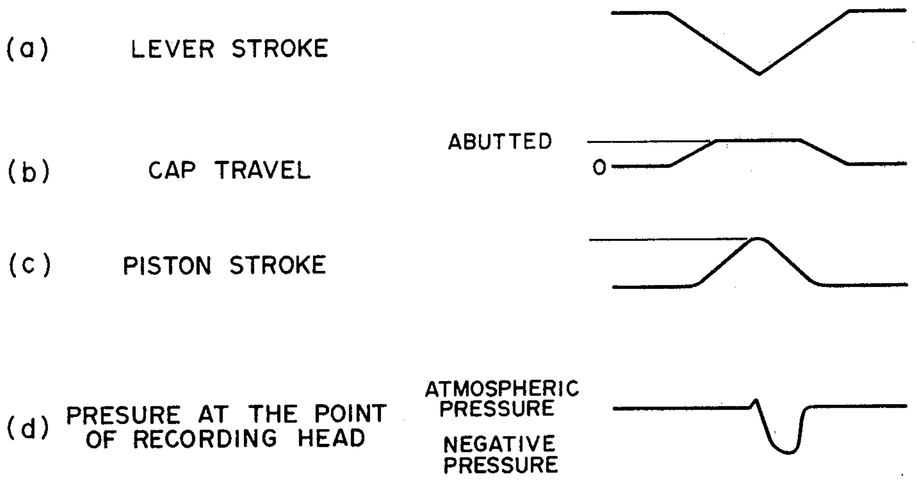
FIG. 10 is a timing chart illustrating the operation of the apparatus according to the invention.

The operation of the above embodiment will be described with reference to the timing chart shown in FIG. 10.

To cap the nozzle, the operator pushes the lever 45 down. The slant surface 40*a* is pushed down by the slant surface 45*a* of the lever. Thereby the cap slide 40 is moved in the direction of A in FIG. 5 and the cap 42 is abutted against the front flat surface portion of the recording head 46. In this abutted position, the cap slide stops moving. Then, the piston 43 starts moving in the direction of A. During this phase of the lever being pushed down, the valve 49 remains open and therefore the pressure at the point of recording head is at the level of atmosphere. Immediately before the lever 45 reaches its lowest position, the piston 43 reaches the area of the exhaust port 48 and closes it. It is preferred that at this time point the piston stops moving and the lever 45 is fastened to the base member 38 through the engagement of the lever's projection 45*e* with the pawl-like portion 38*c* of the base member. However, in the shown embodiment, the piston continues moving a little further beyond the exhaust port 48 and therefore the pressure at the point of recording head slightly rises up. Then it stops and is locked in the position.

To remove the cap from the nozzle, the operator pulls the lever up thereby disengaging the lower projection 45*e* from the pawl 38*c*. Thus, the lever is unlocked and at first the piston 43 starts moving in the direction opposite to A under the elastic spring force stored in the springs 41 and 44. At this time, the valve 49 is closed and therefore the pressure within the cap 42, namely, the pressure at the point of recording head becomes negative. By this negative pressure, air and ink in the nozzle 46*a* are sucked. Thereafter, the cap slide 40 starts moving also in the direction opposite to A. Thus, the cap 42 is removed from the recording head 46.

As readily understood from the foregoing, the second embodiment is simple in structure and operation. Mounting of the cap on the recording head and removing of the cap from it as well as discharging of air from the nozzle can be performed by a simple operation of lever which is pushed down or pulled up. In the second embodiment, if the pressure regulating valve has an ideal diode property, then it is no longer necessary for the piston to close the exhaust port 48.

While the invention has been particularly shown and described with reference to preferred embodiments thereof, it will be understood by those skilled in the art that the foregoing and other changes in form and details can be made therein without departing from the spirit and scope of the invention.

What I claim is:

1. Ink jet recording apparatus comprising:

a recording means having a tip end for ejecting ink to effect recording on a recording medium;

cam means being movable towards said recording means for sealing the tip end of said recording means, said cap means having a surface portion which tapers outwardly to align said cap means with the tip end when said cap means is in a position to seal the tip end; and suction means connected to said cap means for producing a negative pressure to suck the tip end of said recording means when said cap means is positioned to seal said recording means.

2. Ink jet recording apparatus according to claim 1 wherein said cap means includes a hollow part provided therein, and an ink absorber mounted in said hollow part.

3. Ink jet recording apparatus according to claim 1, wherein said suction means comprises a body having a bore and a piston member fitted in the bore of said body for slide movement within said body.

4. Ink jet recording apparatus according to claim 3, wherein said body is provided with a valve for discharging sucked ink from said body, said valve being made of a film material so that said valve is responsive to slight changes in pressure.

5. Ink jet recording apparatus comprising:

a recording head having a tip end for ejecting ink to effect recording on a recording medium;

cap means for sealing said tip end of recording head and having a hollow portion so that the tip end of recording head is sealed with the hollow part; and a piston member fitted in the hollow part for slide movement within said cap means, and for producing a negative pressure to suck the tip end of said recording head in the hollow portion when said cap means is positioned to seal said recording head.

6. Ink jet recording apparatus comprising:

a recording head having a tip end for ejecting ink to effect recording on a recording medium;

cap means for sealing the tip end of said recording head; and suction means connected to said cap means for producing a negative pressure to suck the tip end of said recording head, said suction means including:

a body having a bore;

a piston member fitted in the bore of said body for slide movement within said body; and a valve for discharging ink sucked from said body, and being made of film material so that said valve is responsive to slight changes in pressure.

7. Ink jet recording apparatus comprising:

a cap member for capping a tip end of an ink jet recording head;

pump means including a cylinder part and a piston part fitted in said cylinder part for reciprocal movement therein, said pump means being connected to said cap member to suck the tip end of the ink jet recording head; and a lever being movable relative to said cap member and said pump means, with the movement of said lever relative to said cap member causing said cap member to move into contact with the tip end of the ink jet recording head, and with the movement of said lever relative to said pump member causing said pump means to suck the tip end of the ink jet recording head.

8. Ink jet recording apparatus comprising:

a cap member for contacting a tip end of an ink jet recording head to cap the tip end;

suction means of a piston type connected to said cap member for producing a negative pressure in a space formed when said cap member caps the tip end; and a lever having a cam surface for engaging said cap member and a piston part of said suction means, wherein when said lever moves said cap member into pressure-contact with the tip end, said lever presses the piston part to produce a negative pressure in said suction means.

9. Ink jet recording apparatus according to claim 8, wherein said cam surface produces a negative pressure by pressing the piston part to separate said cap member from said ink jet recording head.

10. Ink jet recording apparats comprising:

a recording head for ejecting a recording liquid from a tip end thereof to effect recording on a recording medium; and a suction pump for sucking a recording liquid from the tip end of said recording head including:

a cylinder member having a recording liquid discharge passage;

a piston slidably fitted in said cylinder member; and a valve for sucking out discharged recording liquid, whereby when said piston is located upward in said cylinder member a space is formed so that said valve closes the recording liquid discharge passage to produce a negative pressure within the space and suck out recording liquid from said recording head, and when said piston is located downward in said cylinder member the space is reduced so that said valve opens the recording liquid discharge passage to discharge recording liquid sucked out from a suction passage.

11. Ink jet recording apparatus according to claim 10, wherein said discharge passage has a lower resistance than the resistance in the suction passage.

12. Ink jet recording apparatus according to claim 10, wherein said discharge passage has a lower resistance than the resistance in the suction passage.

* * * * *

UNITED STATES PATENT AND TRADEMARK OFFICE
CERTIFICATE OF CORRECTION

PATENT NO. : 4,410,900

DATED : October 18, 1983

INVENTOR(S) : KOJI TERASAWA

It is certified that error appears in the above-identified patent and that said Letters Patent is hereby corrected as shown below:

Column 2, line 34 "abosorber" should read --absorber--

Column 5, line 13 after "shaft" insert --39--

Column 6, line 61, Claim 1 delete "a" (first occurrence)
line 63, Claim 1 "cam" should read --cap--

Signed and Sealed this

*Fifteenth* Day of *May 1984*

[SEAL]

*Attest:*

GERALD J. MOSSINGHOFF

*Attesting Officer* *Commissioner of Patents and Trademarks*